(12) United States Patent
Le et al.

(10) Patent No.: US 6,783,213 B2
(45) Date of Patent: Aug. 31, 2004

(54) MICROFLUID DEVICE AND ULTRASONIC BONDING PROCESS

(75) Inventors: Hue P. Le, Beaverton, OR (US); Hoi P. Le, Beaverton, OR (US); Thanh P. Le, Beaverton, OR (US); Linh B. Tran, Aloha, OR (US)

(73) Assignee: PicoJet, Inc., Hillsboro, OR (US)

(*) Notice: Subject to any disclaimer, the term of this patent is extended or adjusted under 35 U.S.C. 154(b) by 0 days.

(21) Appl. No.: 10/272,519

(22) Filed: Oct. 15, 2002

(65) Prior Publication Data

US 2003/0088981 A1 May 15, 2003

Related U.S. Application Data

(62) Division of application No. 09/495,071, filed on Jan. 31, 2000, now Pat. No. 6,464,324.

(51) Int. Cl.⁷ .............................................. B41J 2/045
(52) U.S. Cl. ...................................................... 347/71
(58) Field of Search .............................. 347/68, 69, 70, 347/71; 29/25.35, 800.1; 310/324, 323, 352, 367, 331, 353

(56) References Cited

U.S. PATENT DOCUMENTS

| 4,451,541 A | | 5/1984 | Beal ............................ 428/658 |
| 4,460,906 A | | 7/1984 | Kanayama .................... 347/71 |
| 4,883,219 A | | 11/1989 | Anderson et al. ........... 228/190 |
| 4,897,903 A | | 2/1990 | Johannsen ................. 29/25.35 |
| 5,186,378 A | | 2/1993 | Alfaro ........................ 228/110 |
| 5,455,615 A | | 10/1995 | Burr et al. .................... 347/92 |
| 5,541,469 A | * | 7/1996 | Kaida ......................... 310/367 |
| 5,626,777 A | | 5/1997 | Hügl et al. ............. 219/121.72 |
| 5,650,810 A | * | 7/1997 | Muto ........................... 347/71 |
| 5,689,291 A | | 11/1997 | Tence et al. .................. 347/10 |
| 5,806,159 A | * | 9/1998 | Ohnishi et al. ............. 29/25.35 |
| 5,874,975 A | * | 2/1999 | Hotomi et al. ................. 347/70 |
| 5,889,539 A | | 3/1999 | Kamoi et al. .................. 347/50 |
| 5,921,460 A | | 7/1999 | Topping et al. .......... 228/111.5 |
| 5,955,821 A | * | 9/1999 | Yamamoto et al. .......... 310/324 |
| 6,045,208 A | * | 4/2000 | Hirahara et al. .............. 347/10 |
| 6,111,338 A | * | 8/2000 | Otsuchi et al. .............. 310/352 |
| 6,140,743 A | | 10/2000 | Kishima et al. ............. 310/330 |
| 6,191,520 B1 | * | 2/2001 | Maruyama et al. ..... 310/323.06 |
| 6,362,844 B1 | * | 3/2002 | Shieh et al. ................... 347/70 |

FOREIGN PATENT DOCUMENTS

| EP | 0 357 020 A2 | 8/1989 | ............. B41J/2/135 |
| EP | 0613196 | 8/1994 | ........... H01L/41/09 |
| JP | 06320738 | 11/1994 | .............. B41J/2/16 |
| JP | 08168889 | 7/1996 | ........... B23K/20/00 |

OTHER PUBLICATIONS

Faridi, Hamid R., Devletian, J. H., Le, Hue P., "A New Look at Flux–Free Ultrasonic Soldering," Welding Journal, vol. 42, Sep. 2000, pp. 41–45.

Irving, Bob, "The Search is On for Lead Replacements for Electronics Soldering Lines," Welding Journal, Oct. 1999, pp. 55–60.

Le, Hue P., "Progress and Trends in Ink–Jet Printing Technology," Journal of Imaging Science and Technology, 42(1), Jan./Feb. 1998.

* cited by examiner

Primary Examiner—Anh T. N. Vo
(74) Attorney, Agent, or Firm—Stoel Rives LLP

(57) ABSTRACT

There is disclosed a piezoelectric ceramic ink-jet print head and made by an inventive ultrasonic bonding process. Specifically, there are disclosed several improved features of ink jet print heads, including a more cost-effective bonding process using an ultrasonic bonding technique, an improved piezoelectric ceramic crystal pattern, and improved print head-piezoelectric electrical contacts. Further, there is disclosed an ultrasonic bonding process joining metallic objects with ultrasonic energy.

7 Claims, 7 Drawing Sheets

MICROFLUID DEVICE AND ULTRASONIC BONDING PROCESS

RELATED APPLICATION

This application is a division of U.S. patent application Ser. No. 09/495,071, filed Jan. 31, 2000 now U.S. Pat. No. 6,464,324.

COPYRIGHT NOTICE

®2002 PicoJet, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

The present invention provides a piezoelectric ceramic ink jet print head made by an ultrasonic bonding process. Specifically, the invention provides several improved features of ink jet print heads, including a more cost-effective bonding process using an ultrasonic bonding technique, an improved piezoelectric ceramic crystal pattern, and improved print head-piezoelectric electrical contacts. Further, the present invention provides an ultrasonic bonding process joining metallic objects with ultrasonic energy.

BACKGROUND OF THE INVENTION

Joining metal plates had generally been done through welding or soldering processes. However, such processes alter the surface character of the object or provide for excess bonding material that can leak out and affect the formed object. Therefore, there is a need in the art to provide for a better process for joining metal, particularly metal plates in a high precision manner without leaking bonding material or altering surface characteristics. There is also a need in the art to improve such bonding processes, particularly in the assembly of ink jet printing heads. The following invention was made to address these needs.

Ink-jet printing is a non-impact dot matrix printing technology in which droplets of ink are jetted from a small aperture directly to a specified position on a media to create an image. The mechanism by which a liquid stream breaks up into droplets led to the introduction of the Mingograph, one of the first commercial ink-jet chart recorders for analog voltage signals. In the early 1960's, Sweet of Stanford demonstrated that by applying a pressure wave to an orifice, the ink stream could be broken into droplets of uniform size and spacing. When the drop break-off mechanism was controlled, an electric charge could be impressed on the drops selectively and reliably as they formed out of the continuous ink-stream. The charged drops, when passing through an electric field, were deflected into a gutter for recirculation, and those uncharged drops could fly directly onto the media to form an image. This process became known as a continuous ink-jet. By the 1970's, the IBM 4640 ink-jet printer was introduced as a word-processing printer.

Ink-jet systems, and in particular drop-on-demand ink-jet systems, are well known in the art. The principle behind an impulse ink-jet is the displacement of ink in an ink chamber and subsequent emission of ink droplets from the ink chamber through a nozzle. A driver mechanism is used to displace the ink in the ink chamber. The driver mechanism typically consists of an actuator, often referred to as a transducer, such as a piezoelectric material bonded to a thin diaphragm. When a voltage is applied to the actuator, it attempts to change its planar dimensions, but, because it is securely and rigidly attached to the diaphragm, bending occurs. This bending displaces ink in the ink chamber, causing the flow of ink both through an inlet from the ink supply to the ink chamber and through an outlet and passageway to a nozzle. In general, it is desirable to employ a geometry that permits multiple nozzles to be positioned in a densely packed array. However, the arrangement of ink chambers and coupling of ink chambers to associated nozzles is not a straightforward task, especially when compact ink-jet array print heads are sought. The relatively large size of the actuator required to effectively expel ink drops is a major problem limiting the packing density of ink-jet array print heads.

Other apparatus and methods for increasing the packing density of ink-jet arrays employ electrostrictive materials as actuators. In particular, U.S. Pat. No. 5,087,930 describes a compact ink-jet print head having an array of closely spaced nozzles that are supplied from densely packed ink pressure chambers by way of offset channels. The ink supply inlets leading to the pressure chambers and the offset channels are designed to provide uniform operating characteristics to the ink-jet nozzles of the array. To enhance the packing density of the pressure chambers, the ink supply channels leading to the pressure chambers and offset channels are positioned in planes between the pressure chambers and nozzles. The ink-jet print head is assembled from plural plates with features in all except a nozzle-defining plate being formed by photo-patterning and etching processes without requiring machining or other metal working.

The pressure chambers are driven by ink-jet actuators employing a piezoelectric ceramic, such as lead zirconate titanate ("PZT"). A predetermined amount of mechanical displacement is required from the PZT actuator to displace ink from the pressure chamber and out the nozzles. The displacement is a function of several factors, including: PZT actuator size, shape, and mechanical activity level; diaphragm size, material, and thickness; and the boundary conditions of the bond between the actuator and the diaphragm.

PZT is permanently polarized to enable mechanical activity, which is dependent upon the level of polarization as well as other material properties. To polarize PZT, an electric field is applied such that domains in the PZT are oriented to align with the electric field. The amount of polarization as a function of electric field strength is non-linear and has a saturation level. When the polarizing electric field is removed, the PZT domains remain aligned resulting in a net polarization referred to as a remnant polarization. Alignment of the PZT domains causes a dimensional change in the material. Subsequent applications of an electric field causes a dimensional change that is linear with respect to applied electric field strength.

Unfortunately, PZT has a number of properties that can reduce its mechanical activity over time. For instance, applying an electric field in a direction opposite to the initial remnant polarization can cause a reduction in the amount of polarization. Likewise, cyclic variations of an applied electric field in the direction opposing the polarization can cumulatively and continuously degrade the polarization.

PZT has a property referred to as the Curie point, a temperature at which the remnant polarization in the material becomes zero. Because PZT material is not entirely uniform, there is a range of temperatures over which some but not all of the polarization is lost. The polarization loss is not instantaneous, thereby defining a time-temperature level that should not be exceeded.

PZT actuators have various shapes, including disks and rectangular blocks. Polarization ensures that the PZT materials are anisotropic such that several "d" coefficients may be defined for each shape, in which each "d" coefficient relates a particular dimensional change to a particular direction of the polarization and applied field. For a typical disk-shaped actuator, a commonly employed "d" coefficient is the "d.sub.-" coefficient, which is a measure of the strain perpendicular to the direction of polarization when the electric field is applied in the direction of polarization. The strain is evident as a radial contraction in the actuator because d.sub.31 is negative. A high d.sub.31 value is indicative of high mechanical activity and is desirable for making efficient ink-jet arrays having a high packing density. Stability of the d.sub.31 value is necessary to maintain constant ink-jet performance over an extended time period.

Maintaining PZT actuator polarization during print head manufacturing is difficult for the following reasons. If a disk is bonded to a diaphragm before the disk is polarized, a significant permanent strain is introduced when the disk is polarized. The permanent strain may be sufficiently large to crack the disk, destroying actuator structure. Therefore, the disk must be polarized prior to bonding, which, because of the above-described Curie point problem, severely limits the time and temperature allowable during bonding, thereby limiting the bonding to materials such as organic adhesives. Such adhesives degrade with time at elevated temperatures. Phase-change ink-jet printing requires elevated temperatures to melt solid ink for ejection from the print head. Phase-change ink-jet performance could, therefore, change over time as the adhesive degrades. The electric field strength must also be limited to maintain the PZT material "d" coefficient over an extended time period. Unfortunately, limiting the electric field strength limits the amount of mechanical activity available from the actuator. Therefore, there is a need in the art to lower costs of ink-jet printer head assemblies and to provide for greater durability when assembled by adhesives.

In a piezoelectric ceramic ink jet method, deformation of the piezoelectric ceramic material causes the ink volume change in the pressure chamber to generated a pressure wave that propagates toward the nozzle. This acoustic pressure wave overcomes the viscous pressure loss in a small nozzle and the surface tension force from ink meniscus so that an ink drop can begin to form at the nozzle. When the drop is formed, the pressure must be sufficient to expel the droplet toward a recording medium. In general, the deformation of a piezoelectric driver is on a submicron scale. To have a large enough ink volume displacement for drop formation, the physical size of a piezoelectric driver is often larger than the ink orifice. Thus, there is a continuing need in the art for miniaturization of a piezoelectric ceramic ink jet print head.

The Tektronix 352 nozzle and Sharp 48 nozzle print heads are made with all stainless steel jet stacks. These jet stacks consist of multiple photochemical machined stainless steel plates bonded or brazed together at very high temperatures. Specifically, the Tektronix stack is bonded at high temperature with gold and the Sharp stack is bonded at high temperature with nickel inter-metallic bonds. Inter-metallic bonding requires uniform thickness for design performance consistency and hermetic sealing to prevent inks from leaking externally or between two adjacent ink channels. Solder (problem of heat and flux) and epoxy can also be used to fabricate print heads. In view of trends to increase the number of nozzles, decrease their physical size, and jet many different fluids, there is a need in the art to improve bond integrity among the metallic stacks of print heads to improve stability in view of multiple ink formulations. The present invention, in part, was made to meet this need.

SUMMARY OF THE INVENTION

The present invention provides a process for ultrasonic bonding metallic surface areas comprising the steps of:
 (a) chemically etching bonded surfaces of the metallic surface areas to be bonded;
 (b) applying a uniform coating of bonding material to the metallic surface areas to be bonded, wherein the bonding material comprises a metallic formulation comprising tin (Sn) or tin alloy and optionally another metal selected from the group consisting of nickel (Ni), gold (Au), silver (Ag), palladium (Pd), platinum (Pt), indium (In), zinc (Zn), bismuth (Bi), and combinations thereof;
 (c) assembling the metallic surfaces as appropriate;
 (d) heating the assembled metallic stack to a temperature of from about 2° C. to about 40° C. below the melting temperature of the bonding material; and
 (e) applying an ultrasonic force at a bonding pressure range of from about 200 psi to about 600 psi at an ultrasonic vibration frequency of from about 15 kHz to about 40 kHz for a duration of at least one second, whereby the ultrasonic force will break oxides formed at the interface of bonding materials and increase the temperature to liquify the bonding material.

Preferably, the bonding material is only tin or a formulation having tin at a concentration of at least 70% (by weight) and nickel as the other component. Preferably, the frequency of the ultrasonic force is 20 kHz and the bonding pressure (per square inch) applied on the surface area is from about 400 psi to about 450 psi. Most preferably, the applied bonding pressure on the surface area is approximately 422 psi.

The present invention provides an ink jet print head having a plurality of inner metallic plates having openings and two outer plates joined together wherein a first outer plate is attached to a piezoelectric ceramic material and a second outer plate is an aperture plate, wherein ink channels and cavities are formed within the plurality of inner plates, wherein the plates are bonded together by a process of ultrasonic bonding. Preferably, the process of ultrasonic bonding an ink jet print head comprises the steps of:
 (a) electroplating an etched plate with a bonding material to coat the plate, wherein the bonding material has a thickness of from about 0.76 micron to about 7.6 microns, wherein the bonding material comprises a metallic formulation comprising tin (Sn) or tin alloy and optionally another metal selected from the group consisting of nickel (Ni), gold (Au), silver (Ag), palladium (Pd), platinum (Pt), indium (In), zinc (Zn), bismuth (Bi), and combinations thereof;

(b) assembling the plates in order to form an ink jet print head fixture;

(c) heating the assembled metallic stack to a temperature of from about 2° C. to about 40° C. below the melting temperature of the bonding material; and (d) applying an ultrasonic force to seal all direct plate-to-plate contacts at a bonding pressure range of from about 200 psi to about 600 psi at an ultrasonic vibration frequency of from about 15 kHz to about 40 kHz for a duration of at least one second, whereby the ultrasonic force will break oxides formed at the interface of bonding materials and increase the temperature to liquify the bonding material.

Preferably, the plate has a bonding material coating thickness of from about 1.9 microns to about 3.2 microns. Preferably, the bonding material is only tin or a formulation having tin at a concentration of at least 70% (by weight) and nickel as the other component. Preferably, the frequency of ultrasonic force is 20 kHz and the bonding pressure applied (per square inch) on the surface area is from about 400 to about 450 psi. Most preferably, the applied bonding pressure on the surface area is about 422 psi.

The present invention further provides a piezoelectric ceramic pattern having a plurality of cut out piezoelectric ceramics, each piezoelectric ceramic located with an expandable piezoelectric ceramic pattern, wherein the cut out piezoelectric ceramic is in a shape without angled corners, wherein the piezoelectric ceramic pattern is made by a process comprising:

(a) cutting a flat piezoelectric ceramic plate with a laser programmed to trace a shape without angled corners in a revolution having a starting point and a stopping point extending beyond the starting point, wherein the process of cutting requires a plurality of revolutions;

(b) randomizing the starting point of each revolution of the plurality of revolutions to form the cut-out shape without angled corners; and (c) repeating the cutting and randomizing steps for each shape without angled corners within a piezoelectric ceramic pattern.

Preferably, the piezoelectric ceramic material is a lead zirconate titanate. Preferably, the piezoelectric ceramic material is a plate having a thickness of from about 50 microns to about 200 microns, most preferably from about 75 microns to about 125 microns. Preferably, the laser is a Nd:YAG laser having a radiation wavelength of about 266 nm. Preferably, the piezoelectric ceramic further comprises a flexible cable having terminal bumps that align directly over a cut pattern of piezoelectric ceramic. Most preferably, the flexible cable comprises copper wire embedded in polyimide.

BRIEF DESCRIPTION OF THE DRAWINGS

FIG. 2A shows a top view of a multiple channel print head having multiple piezoelectric ceramic materials cut out to each control an ink outlet. FIG. 2B shows a cross sectional view of a print head stack wherein each piezoelectric ceramic cut out is aligned with a pressure chamber communicating at one side with an ink inlet and further with an ink manifold and on the other side with an ink outlet ultimately communicating with a hole that forms the nozzle. Each of the ink manifold, ink inlets, and ink outlets is formed by alignments of cutouts of the plates.

FIG. 5A shows a pattern of oval shapes, and FIG. 5B shows a cross sectional view of the piezoelectric ceramic on top of the print head stack and the uniformity of the cuts in the piezoelectric ceramic by the laser cutting method of this invention.

FIG. 6A shows a side view of the top of a formed print head showing (from bottom to top) the print head stack, the piezoelectric ceramic contact, a Z-axis adhesive having conductive particles contained within, and the flexible cable with copper contact "bumps. " FIG. 6B is a similar view only there has been heat and pressure applied to the top of the flexible cable to move the copper "bumps" into direct contact with the piezoelectric ceramic contact point having the conductive particles in the Z-axis making electrical contact.

DETAILED DESCRIPTION OF THE PREFERRED EMBODIMENT

The process of ultrasonic bonding metallic surfaces comprises the steps of:

(a) chemically etching the metallic surfaces to be later bonded;

(b) applying a uniform coating of bonding material to the metallic surfaces to be bonded, wherein the bonding material comprises a metallic formulation comprising tin (Sn) or tin alloy and optionally another metal selected from the group consisting of nickel (Ni), gold (Au), silver (Ag), palladium (Pd), platinum (Pt), indium (In), zinc (Zn), bismuth (Bi), and combinations thereof;

(c) assembling the metallic surfaces as appropriate;

(d) heating the assembled metallic stack to a temperature of from about 2° C. to about 40° C. below the melting temperature of the bonding material; and (e) applying an ultrasonic force to seal all direct plate-to-plate contacts at a bonding pressure range of from about 200 psi to about 600 psi at an ultrasonic vibration frequency of from about 15 kHz to about 40 kHz for a duration of at least one second, whereby the ultrasonic force will break oxides formed at the interface of bonding materials and increase the temperature to liquify the bonding material.

Preferably, the bonding material is only tin or a tin alloy formulation having tin at a concentration of at least 70% (by weight) and Ni as the other bonding material surface. Preferably, the frequency of ultrasonic force is 20 kHz and the bonding pressure (per square inch) applied on the surface area is from about 400 psi to about 450 psi. Most preferably, the applied bonding pressure on the surface area is approximately 422 psi.

Figure 1:
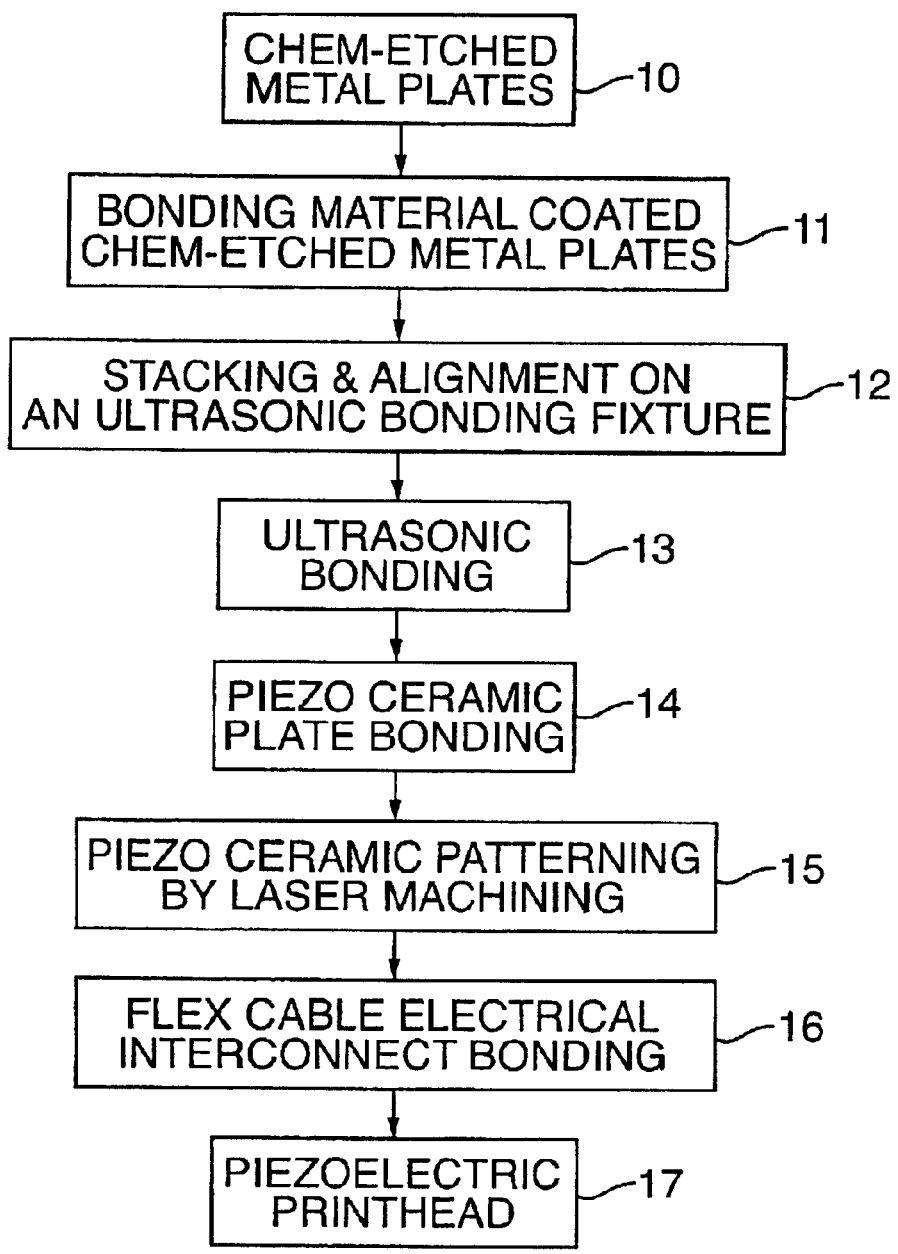
FIG. 1 shows a flow chart of a piezoelectric ceramic print head fabrication process of this invention. The process begins with a plurality of metal plates that are created with photoresist masks. The first step is chemical etching of the plates and ultimately fabrication of the print head stack of plates. In addition, there needs to be attached to the stack of plates a piezoelectric ceramic material, to which a cable is ultimately connected to control the printing process.

The process begins by obtaining the metallic plates. The metallic plates or elements having a metallic surface are preferably made from a non-corrosive metal or alloy thereof. Examples of non-corroding metals (alloys) include stainless steel, aluminum, beryllium copper, titanium, and alloys of the foregoing (e.g., brass). With regard to the process described on the top part of FIG. 1, the first step is chemically etching the surface (10). A photo chemical etching process, which is commonly called chem milling, photo etching, or chem-etched, is a method of blanking parts out of sheet or strip metal using chemicals rather than by the use of "hard tooling," such as stamping dies. In the etching process, a fully degreased metal sheet is covered on both sides with a photoresist. The desired pattern is applied photographically on both sides of the sheet. The sheet is then passed through an etching machine where the unprotected, unwanted portions are removed by an etchant (such as ferric chloride), leaving finished parts. A wide range of materials can be chem-etched including stainless steel, many other steels, copper, aluminum, nickel, and alloys thereof.

The second step entails coating a bonding material to the etched surface. The bonding material is made from either a soft bonding material or a hard bonding material. The soft bonding material is a metallic formulation having at least 70% tin (by weight) and 30% or less (by weight) of a metal selected from the group consisting of Bi, Pb, Cu, In, Zn, Ag, Sb, and combinations thereof. The hard bonding material is a metallic formulation having a metal selected from the group consisting of Ni, Pd, Au, Ag, Pt, and combinations thereof. A metallic surface having a soft bonding material can be "bonded" to a metallic surface having either a soft bonding material or a hard bonding material. However, a metallic surface having a hard bonding material cannot be bonded to a metallic surface also having a hard bonding material. In the case of a print head stack, for example, it is preferred to alternate plates in the stack having a soft bonding material with a plate having a hard bonding material. Moreover, a particular plate or object to be coated can, for example, have a soft bonding material on one side and a hard bonding material on another side. Coating the bonding material to the metallic surface or plate is accomplished by standard techniques, such as electroplating, sputtering, ion plating, physical vapor deposition, dipping (liquid state bonding material), or cladding. Preferably, the process employed for metal plates is electroplating or sputtering or both.

Figure 3:
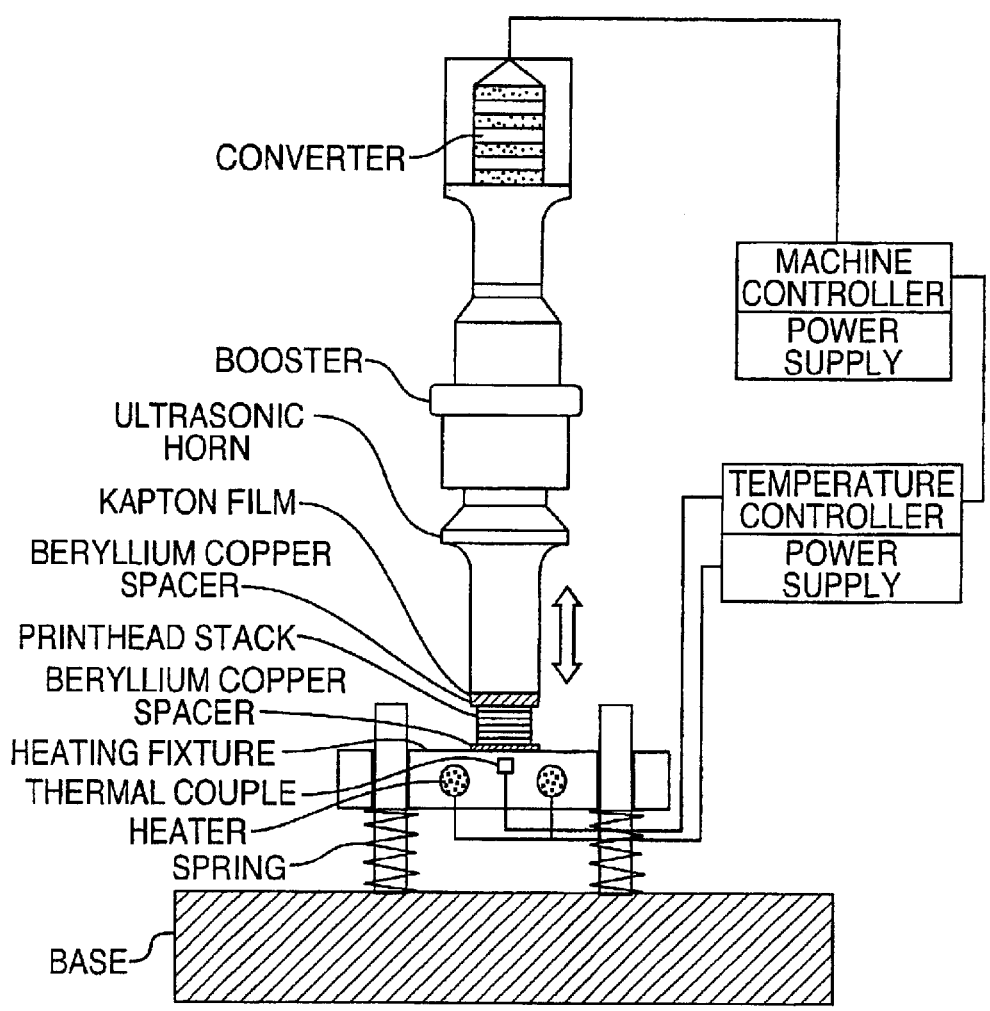
FIG. 3 shows a schematic view of an ultrasonic bonding device. A commercial ultrasonic device is composed of a converter connected to a booster connected to an ultrasonic horn. Such a device is further modified (as shown in FIG. 3) with the addition of a kapton film covering the ultrasonic horn, and a copper spacer. The print head stack is further placed onto a base that comprises a beryllium copper spacer on top of a heating fixture and thermal couple and ultimately suspended with a spring arrangement to dampen vibrations. Both the ultrasonic device and the base elements are independently controlled.

The third step assembles the plates or objects (12) and places them on an ultrasonic bonding fixture, such as the one shown in FIG. 3. In the case of an ink jet print head, alignment is important to create internal ink channels and cavities.

An ultrasonic force (13) is applied to hermetically seal all plate-to-plate or metallic surface contacts to seal and form ink channels and contacts. One advantage of the process is that bonding material will not ooze out into channels and cavities. The ultrasonic force is applied by an ultrasonic welding apparatus (FIG. 3) having an actuator, converter, booster, and ultrasonic horn. Preferably, the welder apparatus is a 9001W Series welder from Branson Ultrasonic Corp., Danbury, Conn. Such devices are normally used for welding thermoplastic parts. The actuator consists of a base, column, and rigid frame that houses a converter, booster, and horn assembly. Often an actuator contains a pneumatically activated carriage mechanism to lower and raise the converter/booster/horn assembly to apply pressure to the work piece (stack). Often a 20 kHz electrical signal from a power supply is applied to the converter or transducer element. This transforms high frequency electrical oscillations into mechanical vibrations at the same frequency as the electrical vibrations. The heart of a converter is a lead zirconate titanate electro-restrictive element. When subject to an alternating voltage, the element expands and contracts, resulting in better than 90% energy conversion. The booster is a resonate half-wave section of aluminum or titanium. It is mounted between the converter and the horn and provides a clamping point for more rigid stack mounting. Boosters are designed to resonate at the same frequency as the converter with which they are used. Boosters are usually mounted at a nodal (minimum vibration) point of axial motion. This mounting minimizes the loss of energy and prevents sound transmission into the support column.

Amplitude is a function of horn shape, which is largely determined by the size and form of the parts to be assembled. The booster may be used to modify the amplitude of vibrations applied to the parts through the horn. The horn is usually selected for a specific application. Each horn is a half-wave section that applies the necessary pressure to the parts to be assembled. It also transfers ultrasonic vibrations from the converter to the work piece. Horns are stepped, conical, exponential, or catenoidal, depending on their profile. The shape of the horn alters the gain factor. Horns may be made from titanium alloys, aluminum, or steel, with titanium being preferred. Aluminum horns are usually chrome- or nickel-plated or hard coated.

In addition, FIG. 3 shows some welder customizations for the inventive process. Specifically, a kapton film was added to protect the horn. The top beryllium copper spacer was also added to protect the horn from vibrations and the bottom barium spacer to protect the lower platform fixture. A heating fixture controls temperature and heats up the stack to be bonded to just below the melting temperature of the bonding material. Springs dampen vibrations that would adversely affect bonding a complex object or a device constructed with very close tolerances, such as an ink jet print head.

The ultrasonic force depends on the area to be bonded. For a one inch square surface area, one should use a force of from about 200 lbs to about 600 lbs, preferably from about 400 lbs to about 450 lbs. There is a linear relationship between area and force. The ultrasonic vibration amplitude is from about 10 microns to about 200 microns, preferably from about 20 microns to about 50 microns. Vibration amplitude is a distance of motion (up and down), preferably at a vibration frequency of about 20 kHz. The effect of the ultrasonic force on the bonding material is to break up an oxide layer and "wet" the bonding material to promote bonding when the force is no longer applied. The bonding material will be hardened through a solidification process.

In addition, the temperature of the stack of metallic surfaces to be bonded is controlled. Tin melts at about 232° C., and alloys of tin formulations usually have lower melting temperatures. Thus, there is preferably a heating fixture present to help soften the bonding material, as shown in FIG. 3. Preferably, the heating element heats up the stack of metallic elements to be bonded at a temperature from about 2° C. to about 40° C. below the melting temperature of the bonding material. Preferably, the bonding temperature is from about 5° C. to about 30° C. below the melting temperature of the bonding material. The ultrasonic force is applied for about 1 second to about 10 seconds. Preferably, the ultrasonic force is applied for about 4 seconds to about 7 seconds.

Figure 4:
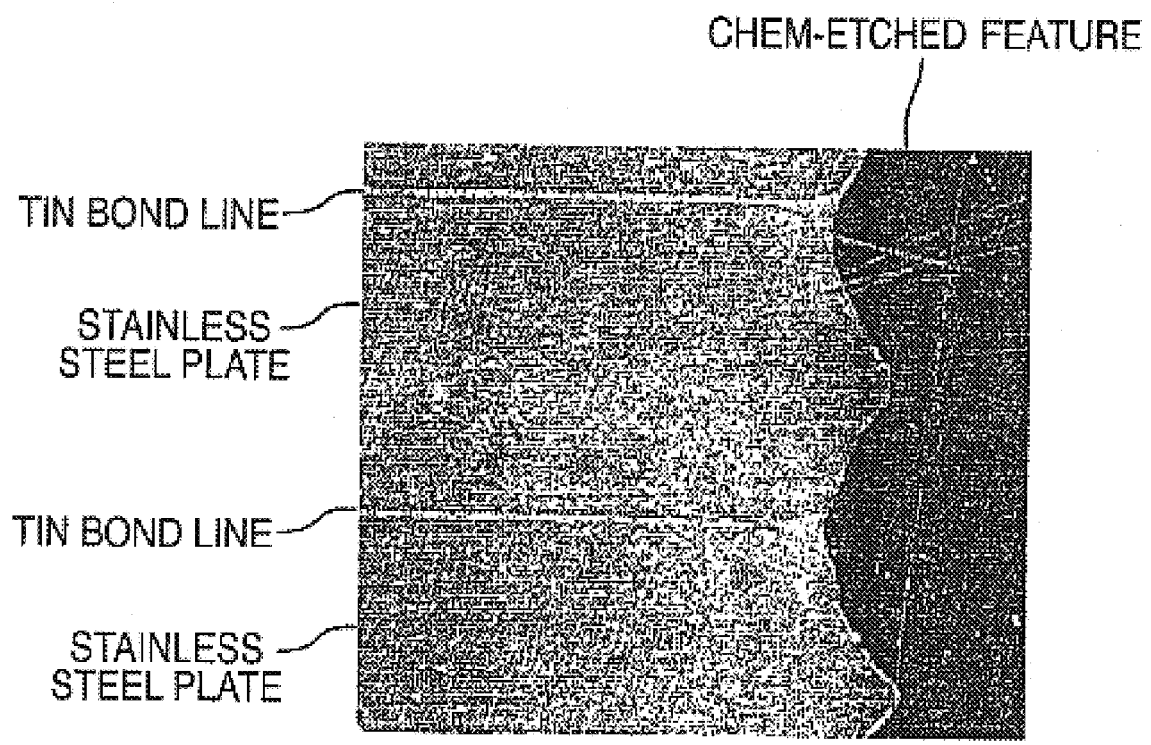
FIG. 4 shows a SEM (scanning electron microscope) photograph of stainless steel plates bonded according to the method of this invention using tin as bonding material. The darker part to the right is a channel within the print head stack. Two thin bond lines are shown that show relatively uniform in thickness with no leakage of bonding material into the cavity (that could impede ink flow).
Figure 5A:
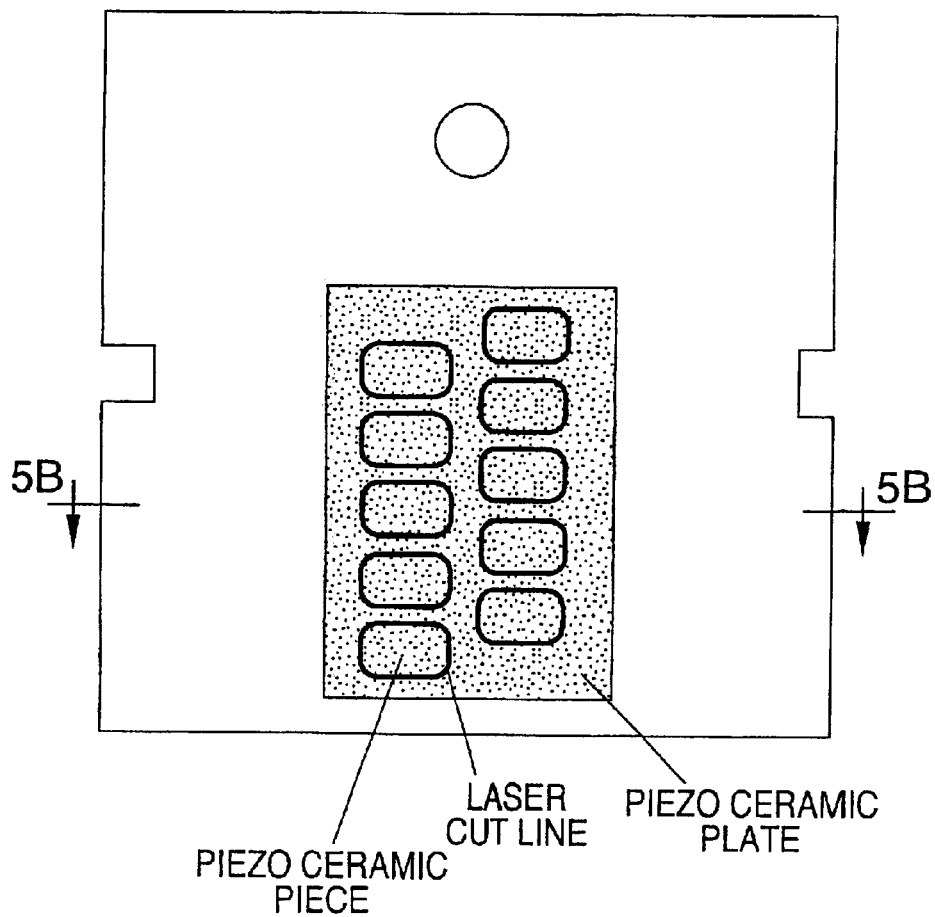
FIGS. 5A and 5B are respective plan and sectional views of a piezoelectric ceramic pattern for laser cutting.
Figure 5B:
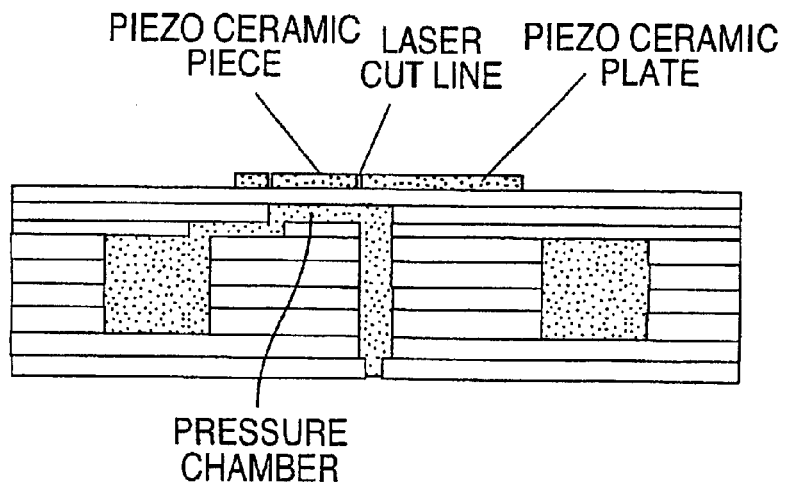

FIG. 4 shows a typical bond as between stainless steel plates and between a soft bonding material having only a tin component and a hard bonding material, such as Ni as described in Example 1 herein. This shows the advantage of the process to precisely form a bond between metallic surfaces, such as stainless steel plates.

Figure 2A:
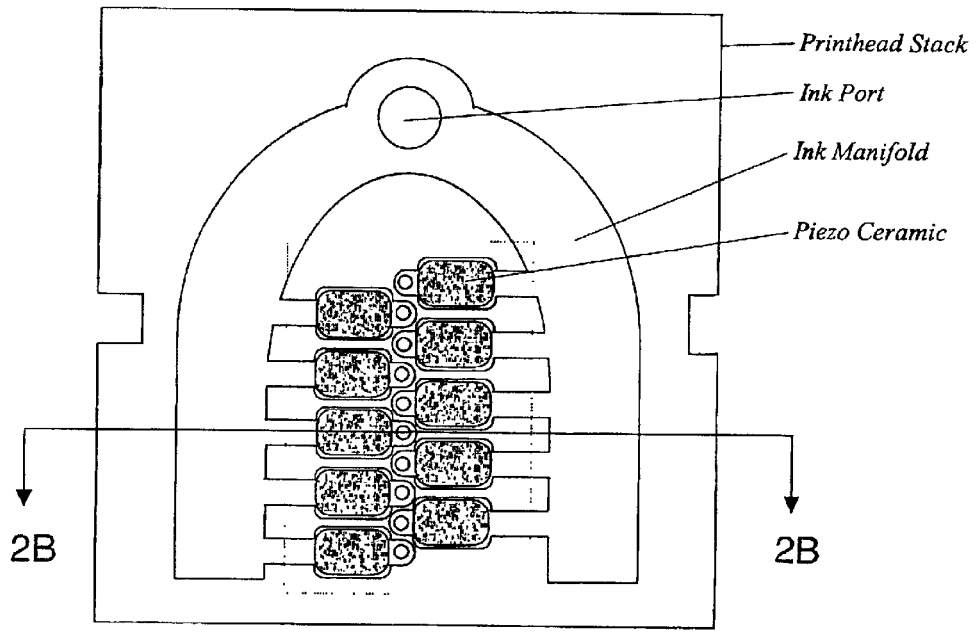
FIGS. 2A and 2B show schematic views of a piezoelectric print head device of this invention. Specifically.
Figure 2B:
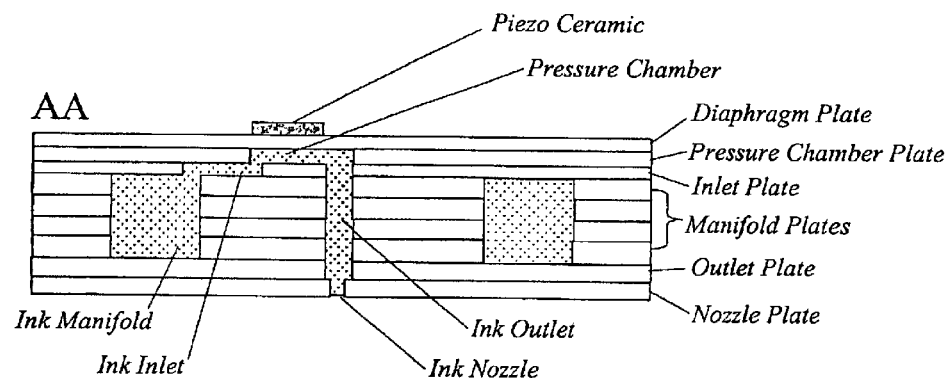

The present invention provides an ink jet print head having a plurality of plates having openings cut out that, when stacked, form pressure chambers, ink inlets, ink manifolds, ink outlets, and an ink outlet in the bottom plate (see, for example, FIG. 2). The stack contains two outer plates bonded to the stack of plates wherein a top outer plate is attached to a piezoelectric crystal (as described herein) and a bottom outer plate is an aperture plate having an ink nozzle (including a very small diameter hole). The stack of plates forms ink channels and cavities within the plurality of inner plates. The plates are preferably made of stainless steel or alloys thereof and are of a thickness of from about 25 mm to about 250 mm, preferably from about 50 mm to about 200 mm. Preferably, the plates are bonded together by the ultrasonic bonding process of the present invention.

The present invention provides an improved ink jet print head that is especially suited for industrial application, such as printing on corrugated paper, metals, ceramics, plastics, and glass. The use of the ultrasonic bonding technique provides an advantage of significantly lower costs of manufacture. For example the estimated cost per nozzle of the print head made by using epoxy bonding or high temperature brazing of stainless steel plates is approximately from about US$1.50 to about US$3.00 to produce. When the ultrasonic bonding process is used, by contrast, the approximate cost per nozzle of the print head is about from US$0.50 to US$1.00 to produce.

It is known that it is most difficult to bond stainless steel due to its high chrome content. Yet stainless steel (due to is lack of corrosion characteristics) is a preferred material for industrial print heads. One cannot use a soldering flux because the flux is strongly acidic and is designed to react with oxides but also leave behind the corrosive residue that difficult to be cleaned. Therefore, various epoxy techniques have been developed to bond the stainless steel plates. However, such epoxy methods are messy, not uniform (a necessity for the precision of an ink jet print head), and expensive in terms of labor costs to assemble. For example, FIG. 4 shows a scanning electron microscope photograph of a bond line between metal plates and an adjacent channel area. It should be noted that there is no leakage or mess from the bonding material.

One method of creating the print heads entails coating the plates with a bonding material, such as a soft metal like tin and tin alloys. One process for coating the plates, for example, is by electroplating. Other coating methods include, for example, sputtering, physical vapor evaporating, ion plating, dipping, cladding, or other techniques that can utilize to provide a thin coating of the bonding materials. The coated plates are assembled into a print head with the appropriate outer plates to which piezoelectric ceramic material is attached and arranged in a pattern and in which apertures are formed for shooting out a droplet of ink. An ultrasonic force is applied across the stack of plates (top to bottom) to seal the plates. The ultrasonic force functions to break oxides at the bonding material interfaces (defined as an area where adjacent plates meet) and increase the temperature within the plates to liquify the bonding material. Once the ultrasonic force is removed and the temperature is decreased, the bonding material hardens as a uniform layer between plates and is bonded to the plates to bind the plates together. Thus, the print head is formed.

The microfluidic device (ink jet print head) in this invention is capable of dispensing fluids that require precise drop volume and/or displacement. The core applications are in ink jet printing, chemical (drugs, reagents, etc.) dispensing, and analytical system. The invented ultrasonic bonding process can be applied to other applications such as flip chip packaging and other electronic assembly processes.

The present invention further provides a piezoelectric ceramic pattern having a plurality of cut out piezoelectric ceramic crystals, each piezoelectric ceramic crystal located with an expandable piezoelectric ceramic pattern, wherein the cut out piezoelectric ceramic crystal is in a shape without angled corners, wherein the piezoelectric ceramic pattern is made by a process comprising:

(a) cutting a flat piezoelectric ceramic plate with a laser programmed to trace a shape without angled corners in a revolution having a starting point and a stopping point extending beyond the starting point, wherein the process of cutting requires a plurality of revolutions;

(b) randomizing the starting point of each revolution of the plurality of revolutions to form the cut-out shape without angled corners, and (c) repeating the cutting and randomizing steps for each shape without angled corners within a piezoelectric ceramic pattern.

Preferably, the piezoelectric ceramic material is a lead zirconate titanate. Preferably, the piezoelectric ceramic material is a plate having a thickness of from about 50 microns to about 200 microns, most preferably from about 75 microns to about 125 microns. Preferably, the laser is a Nd:YAG laser having a radiation wavelength of about 266 nm.

The invention provides a means for maximizing the number of piezoelectric ceramic crystals per surface area, wherein each crystal corresponds to a single ink jet channel. That is, the packing density of piezoelectric ceramic crystals effects a decrease in the size of the print heads. This is in contrast to a straight-line cut pattern design currently being used in commercial products. A piezoelectric ceramic crystal expands and contracts during electrical stimulation and cannot interfere with neighboring piezoelectric ceramic crystals; otherwise, incorrect ink sprays will result. Moreover, each piezoelectric ceramic crystal is positioned directly on top of each pressure chamber (formed within a cavity of a print head within hollows of stainless steel plates) to achieve efficient deformation that leads to a jetting droplet of ink. This positioning problem is further complicated by the nature of laser cutting of piezoelectric ceramic plate to form piezoelectric ceramic pattern. A laser moves its beam across a cut pattern at a uniform speed in order to effect a uniform cut in the ceramic. Depending upon the thickness of a ceramic grid, a laser will cut a deeper hole at a starting point and a stopping point than while it is moving. It takes about 28 passes (round trips) to cut a 100 micron thick PZT piezoelectric ceramic plate into a distinct pattern (laser set at 2 kHz, pulse power is 200 mWatts, scan rate of 10 mm/sec). Preferably the laser is an ESI Model 4420 (Laser Micromachining Systems, Electro Scientific Industries, Inc., Portland, Oreg.). Newer laser models are more powerful (e.g., ESI 5150) and can scan up to 500 mm/sec resulting in a faster processing time. Therefore, the process entails a randomization of starting and stopping points of a laser along an oval track to randomize the starting hole points along such a track. By "without angled corners" it is meant having a curvature without any angles, but possibly having straight regions. A piezoelectric ceramic crystal having a straight-line cutting pattern will have an angled corner (that accumulates stress during deformation) and a limited piezoelectric ceramic pattern packing density.

Typical PZT (lead zirconate titanate) materials are useful for the piezoelectric ink jet print head applications as compared below:

| PROPERTIES | Motorola[1] 3203 | Sinoceramics[2] 5B23D | Sumitomo[3] SPEM-5C |
|---|---|---|---|
| Piezoelectric Constant[4], $D_{31}$ (X10–12 C/N) | −260 | −210 | −210 |
| Coupling Coefficient[5], $K_p$ | .69 | .62 | .60 |
| Curie Temperature[6], $T_c$ (° C.) | 260 | 300 | 315 |
| Density[7], d (g/cm3) | 7.7 | 7.6 | 7.85 |

NOTES:
[1]Motorola Ceramic Product Division (Albuquerque, New Mexico, U.S.A.)
[2]Sinoceramics, Inc. (Shanghai, China)
[3]Sumitomo Metal Industries, LTD. (Tokyo, Japan)
[4]Piezoelectric d-constant is the ratio of electric charge generated per unit area to an applied force and is express in Coulomb/Newton.
[5]Coupling coefficient is defined as the ratio of the mechanical energy accumulated in response to an electric input or vice versa.
[6]The crystal structure of a material changes at the Curie temperature from piezoelectric (non-symmetrical) to non-piezoelectric (symmetrical) form. The Curie temperature is expressed in degrees Celsius.
[7]Density of a material is expressed as the ratio of mass of a body to its volume.

Therefore, the piezoelectric ceramic grid structure will result in improved dependability over time due to lower stresses of the oval design and a higher density due to the grid pattern. The higher density again results in a denser print head and lower cost of manufacture.

The piezoelectric ceramic pattern further comprises an electrically conductive film placed over the piezoelectric ceramic crystals, wherein the electrically conductive film is cured by heat and pressure over a fixed area of each piezoelectric ceramic crystal and comprises an adhesive having conductive particles within. Most preferably, the piezoelectric ceramic crystal further comprises a flexible cable having terminal bumps that align directly over a cut pattern of piezoelectric ceramic crystals making an electrical connection through the conductive particles. Most preferably, the flexible cable comprises copper wire embedded in polyimide.

Figure 6A:
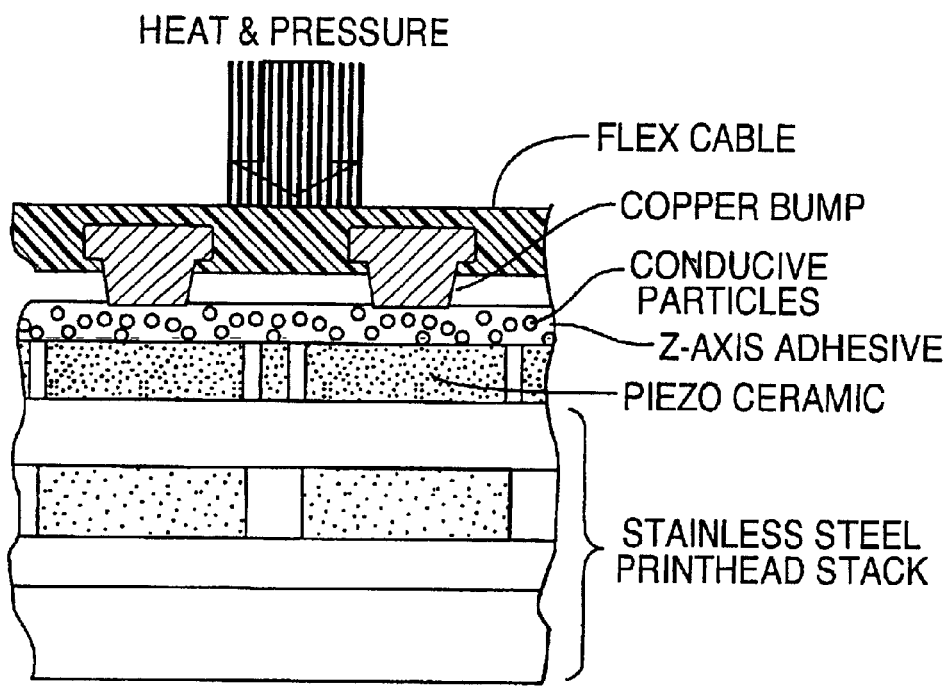
FIGS. 6A and 6B show the bonding of a flexible cable contact to the respective piezoelectric ceramic contact points.
Figure 6B:
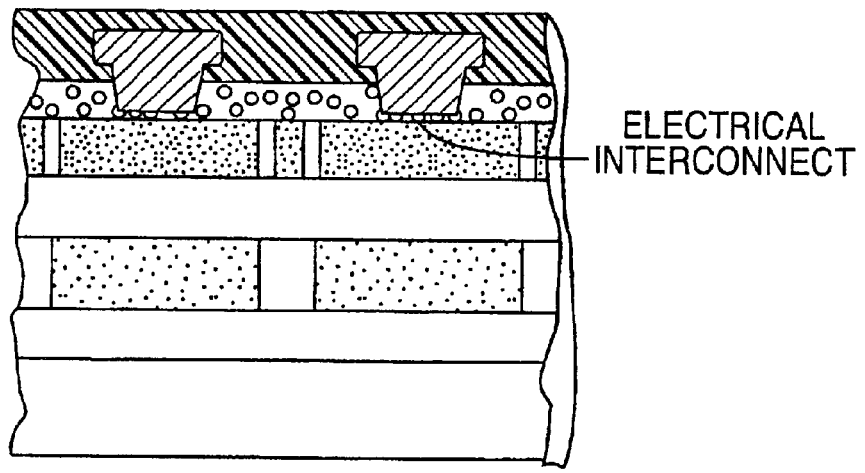
Figure 7:
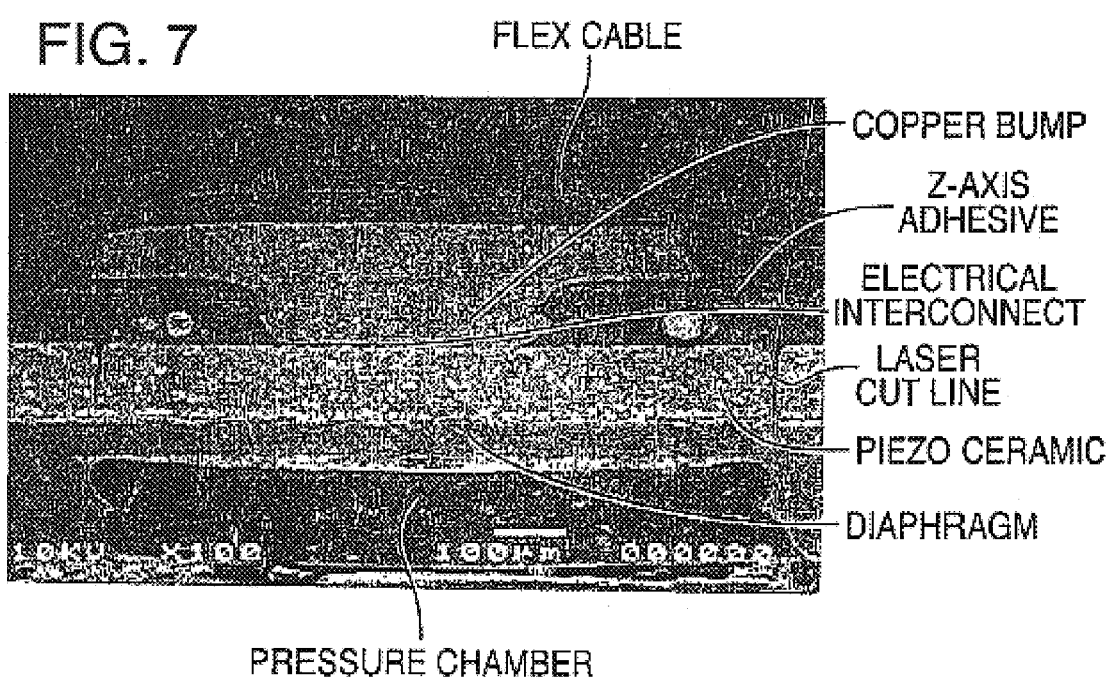
FIG. 7 shows a similar view as FIG. 6 except it is a scanning electron microscope (SEM) image showing the direct contact of a copper bump in the flexible cable contacting a piezoelectric ceramic contact point on top of a top plate in a print stack (and showing the pressure chamber below).

Current print heads connect an electrical current to the surface of the piezoelectric ceramic crystal by reflux solder or conductive epoxy. Such techniques are labor intensive (to solder or apply epoxy by hand) and are limited by density because human labor can work down only to a finite dimension through hand-eye coordination. The present invention creates a defined piezoelectric ceramic crystal pattern, as described herein. Over this pattern (and in place of solder or conductive epoxy) is placed a Z-axis conductive film (manufactured by 3M, Hitachi, and others), as shown in FIG. 6. The conductive film is cured by heat and pressure over a fixed area. A flexible cable (to carry current to each piezoelectric crystal and direct the print head) will have terminal bumps that will align to each functioning piezoelectric ceramic crystal. The Z-axis film allows for a single connection without shorting (such as will happen if solder or conductive epoxy is improperly applied) and makes the connection to the flexible cable stick to the piezoelectric crystal (FIG. 6). A scanning electron microscope photograph (FIG. 7) shows a terminal bump aligned over a piezoelectric ceramic crystal connected by conductive film and further aligned over a pressure chamber within the print head stack.

EXAMPLE

This example illustrates the dimensions and assembly of a preferred ink jet print head using the process of this invention. Chemically-etched plates were coated with bonding material that alternated between a "soft" bonding material made from tin electroplating to a "hard" bonding material made from nickel electroplating. Each part is listed in the table below.

| Part Name | Thickness (micron) | Feature Dim. (micron) | Bonding Material |
|---|---|---|---|
| Diaphragm | 50.8 | | hard |
| Pressure Chamber | 152.4 | WIDTH (W) 101.6 × LENGTH (L) 1270 | soft |
| Inlet | 101.6 | W 254 × L 1016 | hard |
| Manifold 1 | 203.2 | W 2540 × L 17780 | soft |
| Manifold 2 | 203.2 | W 2540 × L 17780 | hard |
| Manifold 3 | 203.2 | W 2540 × L 17780 | soft |
| Manifold 4 | 203.2 | W 2540 × L 17780 | hard |
| Outlet | 203.2 | DIAMETER 508 | soft |
| Nozzle | 76.2 | DIAMETER 50 | hard |

The nozzle diameter was 20 microns to 75 micons, preferably 30 microns to 50 microns. The nozzle plate is preferably made from stainless steel by EDM (electro discharge machining). The bonding process parameters are a bonding force of 422 lbs (on a square inch plate) having the stack heated to 215° C., an ultrasonic bonding time of 5 seconds and a vibration amplitude of 28 microns at an ultrasonic frequency of 20 kHz.

What is claimed is:

1. A piezoelectric ceramic pattern having a plurality of cut out piezoelectric ceramic crystals, each piezoelectric ceramic crystal located with an expandable piezoelectric ceramic pattern, wherein the cut out piezoelectric ceramic crystal is in a shape without angled corners, wherein the piezoelectric ceramic pattern is made by a process comprising:

cutting a flat piezoelectric ceramic plate with a laser programmed to trace the shape without angled corners in a revolution having a starting point and a stopping point extending beyond the starting point, wherein the process of cutting requires a plurality of revolutions;

randomizing the starting point of each revolution of the plurality of revolutions to form the cut-out shape without the angled corners, and repeating the cutting and randomizing steps for each shape without angled corners within the piezoelectric ceramic pattern.

2. The piezoelectric ceramic pattern of claim 1, wherein the piezoelectric ceramic material is a lead zirconate titanate.

3. The piezoelectric ceramic pattern of claim 1, wherein the piezoelectric ceramic material is a plate having a thickness of from about 50 microns to about 200 microns.

4. The piezoelectric ceramic pattern of claim 1, wherein the piezoelectric ceramic material is a plate having a thickness of from about 75 microns to about 125 microns.

5. The piezoelectric ceramic pattern of claim 1, wherein the laser is a Nd, Yg laser having a radiation wavelength of about 266 nm.

6. The piezoelectric ceramic pattern of claim 1, wherein the piezoelectric crystal further comprises a flexible cable having terminal bumps that align directly over a cut pattern of piezoelectric crystal.

7. The piezoelectric ceramic pattern of claim 6, wherein the flexible cable comprises copper wire embedded in polyimide.

* * * * *